United States Patent
Le Sage et al.

(10) Patent No.: US 10,841,345 B2
(45) Date of Patent: Nov. 17, 2020

(54) PROCESSING OF SIGNALLING MESSAGES IN A SYSTEM COMPRISING SEVERAL CORE NETWORKS

(71) Applicant: ORANGE, Paris (FR)

(72) Inventors: Benoit Le Sage, Paris (FR); Philippe Fremond, Paris (FR); Miguel Labranche, Bonneuil Sur Marne (FR)

(73) Assignee: Orange, Paris (FR)

( * ) Notice: Subject to any disclaimer, the term of this patent is extended or adjusted under 35 U.S.C. 154(b) by 114 days.

(21) Appl. No.: 15/318,540

(22) PCT Filed: Jun. 16, 2015

(86) PCT No.: PCT/FR2015/051595
§ 371 (c)(1),
(2) Date: Dec. 13, 2016

(87) PCT Pub. No.: WO2015/193608
PCT Pub. Date: Dec. 23, 2015

(65) Prior Publication Data
US 2017/0126748 A1  May 4, 2017

(30) Foreign Application Priority Data
Jun. 17, 2014 (FR) .................................... 14 55525

(51) Int. Cl.
*G06F 15/16* (2006.01)
*H04L 29/06* (2006.01)
(Continued)

(52) U.S. Cl.
CPC ...... *H04L 65/1063* (2013.01); *H04L 41/0893* (2013.01); *H04L 65/1016* (2013.01);
(Continued)

(58) Field of Classification Search
CPC ............. H04L 65/1063; H04L 41/0893; H04L 65/1016; H04L 65/1046; H04L 65/1059;
(Continued)

(56) References Cited

U.S. PATENT DOCUMENTS

| 2007/0155386 A1 | 7/2007 | Wahl et al. |
| 2008/0125114 A1* | 5/2008 | Dorenbosch ............ H04W 8/04 |
| | | 455/433 |

(Continued)

FOREIGN PATENT DOCUMENTS

| EP | 2 709 410 A1 | 3/2014 |
| WO | 2010/006636 A1 | 1/2010 |

OTHER PUBLICATIONS

Attached please find a Written Opinion from the PCT application PCT/FR2015/051595.

*Primary Examiner* — Ryan J Jakovac
(74) *Attorney, Agent, or Firm* — Haverstock & Owens LLP (57) ABSTRACT

The invention relates to a processing method, implemented by an application server (AS) capable of transmitting and receiving signalling messages via a first communication link (L1) established with a first core network (CR1). According to the invention, the processing method is suitable for obtaining, depending on a first received signalling message, a second signalling message comprising an identifier of a destination terminal, in order to determine, depending on said identifier, if the destination terminal is connected to a second core network (CR2) and to transmit the second message via a second communication link established with the second core network (CR2). The invention also relates to a method for managing a signalling message, capable of receiving, via the second link, the second signalling message, and transmitting it to the destination terminal. The invention relates to an application server (AS) and to a (Continued)

server (S-CSCF) of a core network (CR2) implementing the processing and managing methods respectively.

12 Claims, 8 Drawing Sheets

(51) Int. Cl.
*H04W 68/12* (2009.01)
*H04L 12/24* (2006.01)
*H04W 8/18* (2009.01)
*H04W 8/04* (2009.01)

(52) U.S. Cl.
CPC ...... *H04L 65/1046* (2013.01); *H04L 65/1059* (2013.01); *H04L 65/1073* (2013.01); *H04W 68/12* (2013.01); *H04W 8/04* (2013.01); *H04W 8/18* (2013.01)

(58) Field of Classification Search
CPC .... H04L 65/1073; H04W 68/12; H04W 8/04; H04W 8/18
See application file for complete search history.

(56) References Cited

U.S. PATENT DOCUMENTS

2012/0131167 A1* 5/2012 Shen ................. H04L 65/1016
709/223
2015/0208446 A1* 7/2015 Yeoum ............... H04L 65/1046
370/329

* cited by examiner

| IdU | IdF | IdM |
|---|---|---|

Figure 4a

| IdU | IdF1 Connected ADS1 | IdM1 Disconnected | DSU1 |
|---|---|---|---|
| IdU1 | IdF2 Connected ADS1 | IdM2 Connected ADS2 | DSU2 |
| ... | ... | ... | ... |

PROCESSING OF SIGNALLING MESSAGES IN A SYSTEM COMPRISING SEVERAL CORE NETWORKS

The invention pertains to the general field of telecommunications.

It relates more particularly to the management of access to multimedia services common to several core networks, for a user equipped with a fixed or mobile terminal.

The IMS (IP Multimedia Subsystem) standard proposes a wholly IP (Internet Protocol) architecture for implementing multimedia services such as for example Voice over IP services or videoconferencing over IP services.

This architecture is a modular architecture within a core network. It provides service functionalities ("services enablers") which can be used by the various services implemented for a set of terminals registered with this core network.

An example of such functions is for example communication transfer.

This architecture was initially developed in the field of fixed networks. Later on, with the arrival of VoLTE (Voice over Long Term Evolution) technology, it has appeared in the field of mobile networks.

Currently, this architecture is deployed for a set of fixed terminals, for example the terminals of an operator, or for a set of mobile terminals.

Stated otherwise, an IMS affording a first set of multimedia services for a pool of fixed terminals and an IMS affording a second set of multimedia services for a pool of mobile terminals coexist.

This multi-IMS environment induces a partitioning of the services rendered by IMS network and by access families, fixed or mobile, for subscribers.

Figure 1:
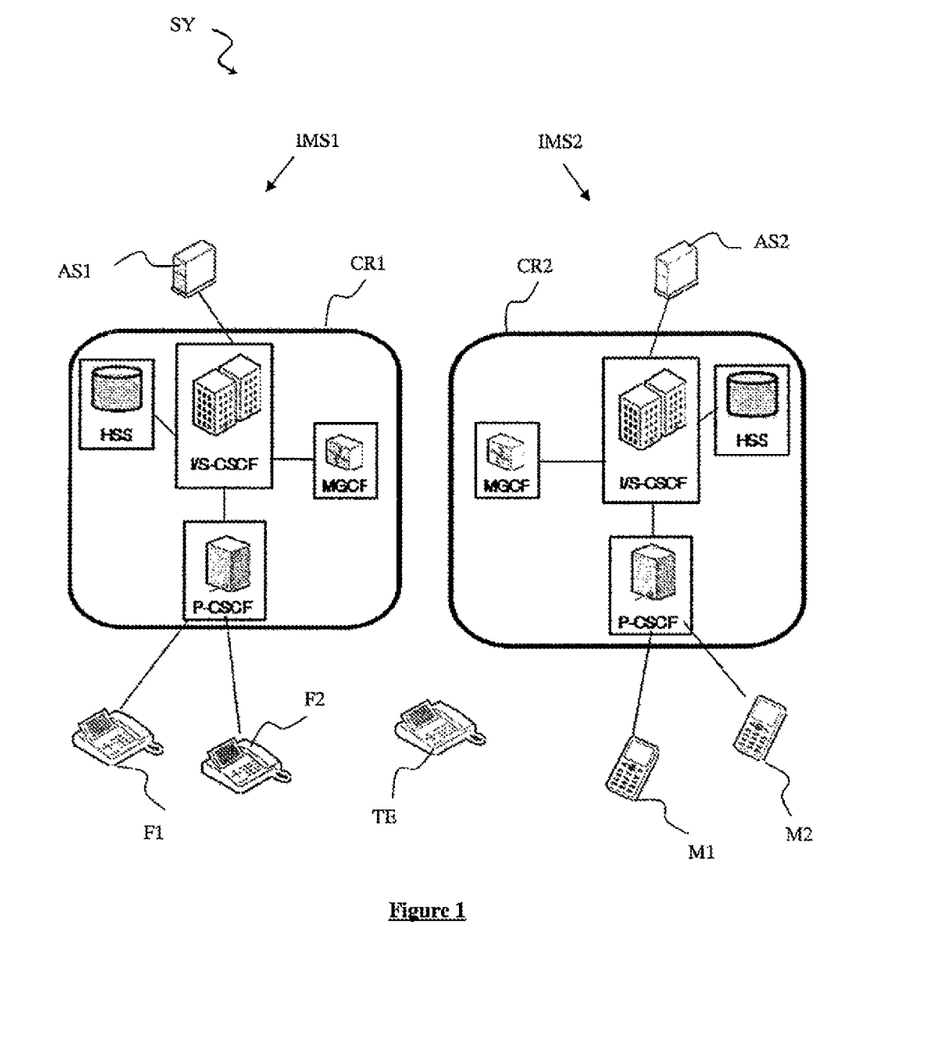
FIG. 1 is a diagram illustrating a system of the state of the art.

FIG. 1 represents an exemplary system of the state of the art SY comprising a first network IMS1 and a second network IMS2.

The first network IMS1 comprises a plurality of devices forming a first core network CR1, an application server AS1 and a plurality P1 of terminals F1, F2 etc. registered with the core network CR1. The terminals F1, F2 etc. of the plurality P1 are for example fixed terminals.

It is assumed that information relating to the profile of each user of a terminal of the plurality P1 is recorded within the first core network CR1 and accessible by the application server AS1 of this network.

The application server AS1 is able to provide predefined service functionalities for the first network IMS1 to the users of the terminals of the plurality P1 as a function of the recorded profile information.

The second network IMS2 comprises a plurality of devices forming a second core network CR2, an application server AS2 and a plurality P2 of terminals M1, M2 etc. registered with the core network CR2. The terminals M1, M2 etc. of the plurality P2 are for example mobile terminals.

It is assumed that information relating to the profile of each user of a terminal of the plurality P2 is recorded within the second core network and accessible by the application server AS2.

The application server AS2 is able to provide predefined service functionalities for the second network IMS2 to the users of the terminals of the plurality P2.

In this architecture, the first and the second application server do not directly interact together.

In order for identical service functionalities to be rendered by each core network, it is necessary that similar information be recorded on the one hand within the first network and on the other hand within the second network.

For example, within the framework of a communication service of Voice over IP type, an implemented service functionality is for example a service of simultaneous ringing on several terminals.

It is for example assumed that subsequent to a request of a user U of the terminal F1 to benefit from this service for simultaneous ringing on the fixed terminal F1 registered with the first core network CR1 and on a terminal M1 registered with the second core network CR2, an identifier of the terminal M1 has been recorded in the profile of the user U at the level of the first core network CR1.

In order for this service functionality to also be rendered by the second core network CR2 for this user U, similar information must also be recorded within the second core network.

For example, an identifier of the terminal F2 has been recorded in the profile of the user U.

This dual-recording is expensive in terms of input time and storage resources.

Moreover, this architecture may give rise to cases of generating call loops between the two networks.

For example, when a call originating from a terminal TE outside the network, destined for a terminal of the first network IMS1, for example the terminal F1, is received at the level of the first core network, a signaling message is transmitted to the application server AS1 associated with this core CR1 which triggers the service logic recorded for the called party U.

The application server AS1 sends back in return via the first core network CR1 a call establishment signaling message destined for the mobile terminal M1. This message is received by the second core network CR2, which in its turn addresses itself to the application server AS2 which is associated therewith.

The application server AS2 triggers the service logic recorded for the user U and sends back in return via the second core network CR2, a call establishment signaling message destined for the fixed terminal. This message is received by the first core network CR1, which again addresses itself to the application server AS1 which is associated therewith etc.

One of the aims of the invention is to remedy inadequacies/drawbacks of the prior art and/or to afford improvements thereto.

To this end, the invention proposes a communication-related processing method, implemented by an application server able to send and to receive signaling messages via a first communication link established between said application server and a first set of devices forming a first core network.

This processing method comprises the following steps:
- reception, via the first communication link, of a first signaling message;
- obtaining, as a function of said first signaling message received, of a second signaling message comprising an identifier of a recipient terminal of said second message;
- analysis to determine, as a function of said recipient terminal identifier, whether said recipient terminal is connected to a second core network of a predefined group of core networks, said second core network being different from said first core network;
- in case of positive determination, transmission of said second signaling message via a second communication link established between said application server and a second set of devices forming said second core network.

The processing method thus makes it possible to use a single application server for several core networks.

Each core network is linked to the application server via a communication link allowing the two entities to exchange signaling messages relating to an established communication or one in the course of establishment. An identifier of the recipient terminal contained in a signaling message obtained by the application server allows the application server to identify the core network to which said recipient terminal is connected, and consequently to choose the communication link to be used to transmit said message.

The processing of the signaling messages by a single application server makes it possible to coordinate the services rendered by each core network.

Moreover, the information necessary for the implementation of the services is input just once.

According to a particular characteristic of the processing method, said recipient terminal identifier comprises an identifier of the second core network.

The analysis of the identifier makes it possible to determine in a fast, simple and secure manner which core network is the one to which the recipient terminal is connected.

According to a particular embodiment of the processing method, during the transmission step, said second signaling message is transmitted to a device of said second set of devices, an address of said device previously being recorded in association with said recipient terminal identifier.

For each core network of a set of at least two core networks, at least one address is previously recorded. A said address is that of a device of the core network considered.

The recipient terminal identifier contained in the second signaling message makes it possible to determine the core network to which this terminal is linked. A previously recorded address of the core network considered is thereafter used to directly address a device of this core network able to transmit the message to the recipient terminal, directly or by way of one or more other devices of this core network.

The prior recording of an address in association with an identifier of the recipient terminal allows the application server to transmit the second signaling message to a predefined entity of the second core network. The processing of the second signaling message is thus made easier.

According to a particular characteristic of the processing method, said address is recorded by said application server following the receipt of a registration message transmitted previously by said recipient terminal.

A core network generally comprises several devices able to communicate directly with the application server via a communication link established between the core network and the application server. The device to which a terminal is linked varies from one connection to another.

The transmission to the application server of an address of the device to which the terminal is connected makes it possible to inform the server, in dynamic mode, of the connected terminals and of the device, typically a server, to which the terminal is linked.

When the application server has a signaling message to be transmitted to a terminal, it can thus address this message directly to the device to which the terminal is hooked up. This direct transmission allows better circulation of the signaling messages between the application server and the core networks.

According to a particular embodiment of the processing method, said second signaling message transmitted during said transmission step comprises a processing indicator signaling that said second message has been processed by said application server.

In a conventional manner of operation, a device receiving a signaling message transmits this message to the application server to which it is linked and waits for a return message before transferring the message to the terminal. The processing indicator is a simple means to inform the device that, the message having already been processed by the application server, the device can transmit it directly to the recipient terminal.

According to a particular characteristic of the processing method, said second message is said first message.

According to another particular characteristic of the processing method, said second message is determined as a function of a terminal identifier contained in said first signaling message and as a function of service data previously recorded in association with a user identifier of said terminal.

The method thus applies equally well to the messages sent by a core network, for example during a request for establishment of a communication originating from a terminal, as to the messages determined by the application server to implement a service functionality relating to a communication in the course of establishment or an established communication.

It thus allows easier processing of the signaling messages between several core networks.

The invention also pertains to a method for managing a signaling message relating to a communication between two users, implemented by a server of a set of devices forming a second core network.

This management method comprises the following steps:
reception, via a second communication link established between an application server and said server, of a second signaling message comprising a terminal identifier for the recipient of said message, said second message having been obtained by said application server as a function of a first signaling message received by said application server via a first communication link established between said application server and a first set of devices forming a first core network;
transmission of said second message destined for said second terminal.

According to a characteristic of the management method, said second signaling message comprises a processing indicator signaling that said message has been processed by said application server.

The invention also pertains to an application server comprising a first communication module for sending and receiving signaling messages relating to a communication between two users, via a first communication link established between said application server and a first set of devices forming a first core network.

This application server also comprises:
a module for obtaining, as a function of a first signaling message received via the first communication link, a second signaling message comprising an identifier of a recipient terminal of said second message;
an analysis module for determining, as a function of said recipient terminal identifier, whether said recipient terminal is connected to a second core network of a predefined group of core networks, said second core network being different from said first core network;

a second communication module for transmitting, in case of positive determination, said second signaling message via a second communication link established between said application server and a second set of devices forming said second core network.

The invention further pertains to a server of a set of devices forming a second core network, the server comprising:
- a reception module for receiving, via a second communication link established between an application server and said server, a second signaling message relating to a communication and comprising a terminal identifier for the recipient of said message, said message having been obtained by said application server as a function of a first signaling message received by said application server via a first communication link established between said application server and a first set of devices forming a first core network,
- a transmission module for transmitting said second message destined for said second terminal.

According to a preferred implementation, the various steps of the method according to the invention are implemented by a software package or computer program.

The invention thus relates to a software package or program, liable to be executed by a computer or by a data processor, this software package/program comprising instructions for controlling the execution of the steps of a communication-related processing method, respectively a management method. These instructions are intended to be stored in a memory of a computing device, loaded and then executed by a processor of this computing device.

This software package/program can use any programming language, and be in the form of source code, object code, or of code intermediate between source code and object code, such as in a partially compiled form, or in any other desirable form.

The computing device can be implemented by one or more physically distinct machines and exhibits overall the architecture of a computer, including constituents of such an architecture: data memory or memories, processor(s), communication buses, hardware interface(s) for connecting this computing device to a network or another item of equipment, user interface(s), etc.

The invention also relates to an information medium readable by a data processor, and comprising instructions of a program such as mentioned hereinabove. The information medium can be any entity or device capable of storing the program.

Other features and advantages of the present invention will become apparent in the following description of an embodiment given by way of nonlimiting example, with reference to the appended drawings, in which.

The invention is implemented by means of software components and/or hardware components. In this regard, the term "module" can correspond in this document either to a software component, or to a hardware component or to a set of hardware and/or software components which is able to implement a function or a set of functions, according to what is described hereinbelow for the module concerned.

A software component corresponds to one or more computer programs, one or more subprograms of a program, or more generally to any element of a program or of a software package. Such a software component is stored in memory and then loaded and executed by a data processor of a physical entity (terminal, server, gateway, set-top-box, router, etc.) and is liable to access the hardware resources of this physical entity (memories, recording media, communication buses, electronic input/output cards, user interfaces, etc.).

In the same manner, a hardware component corresponds to any element of a hardware set. It may entail a programmable hardware component or one with integrated processor for the execution of software, for example an integrated circuit, a chip card, an electronic card for the execution of firmware, etc.

A first embodiment of a processing method and of a management method will now be described with reference to FIGS. 2 to 4.

Figure 2:
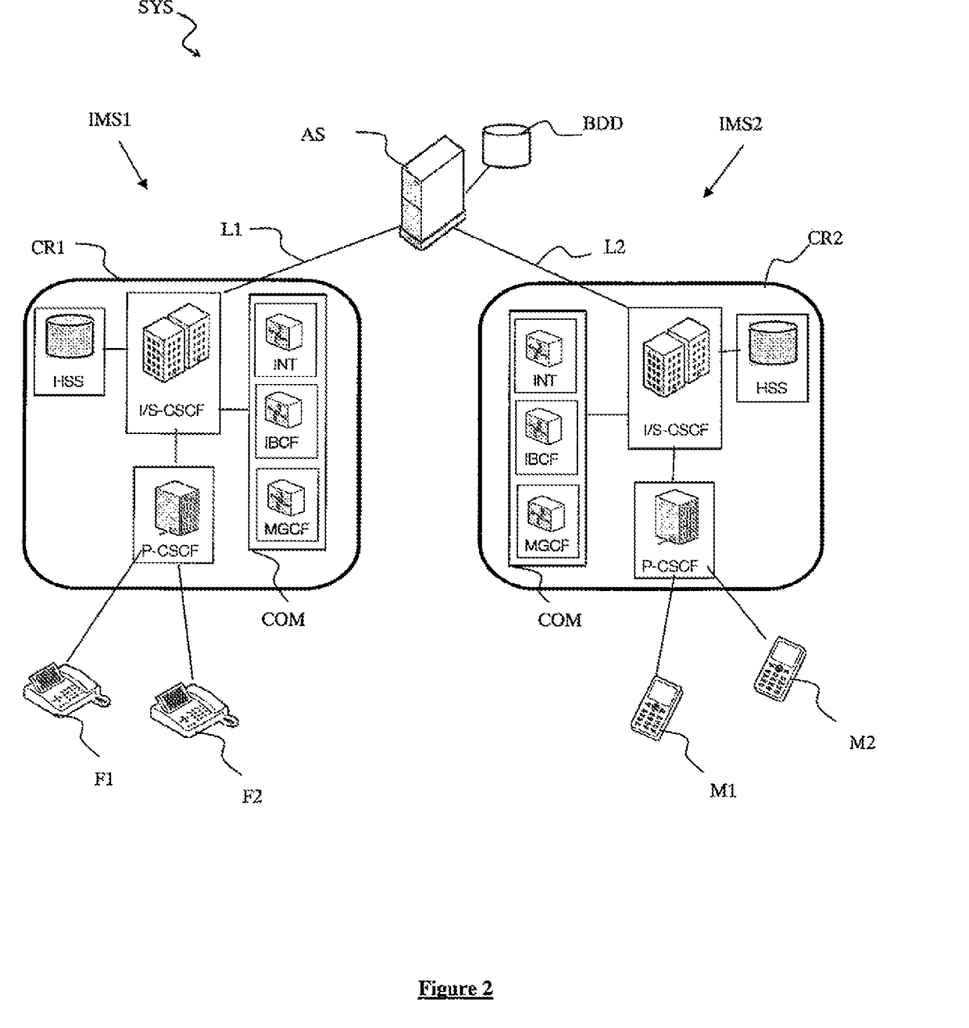
FIG. 2 is a diagram illustrating a system according to a first embodiment.

With reference to FIG. 2, a system SYS comprises an application server AS and two core networks CR1 and CR2.

The core network CR1 is for example a fixed core network and is able to communicate with the application server AS via a first communication link L1.

The core network CR2 is for example a mobile core network and is able to communicate with the application server AS via a second communication link L2.

The communication link L1, respectively the communication link L2, allows the communication of signaling messages, for example messages of SIP type. The interface between the two entities linked by the first, respectively the second communication link is for example an interface of ISC type (for "IP multimedia Subsystem Service Control Interface" developed in the 3GPP standard and described notably in the document "3GPP TS 23.228 V12.4.0 Group Services and System Aspects; IP Multimedia Subsystem (IMS); Stage 2 (Release 12)".

The first core network CR1 and the second core network CR2 form a group G of core networks, within the meaning of the invention.

By way of alternative, the group G comprises two fixed core networks or two mobile core networks.

Also by way of alternative, the group G comprises more than two core networks.

Each core network of the group G is interconnected under IP with the other core networks of the group G. Stated otherwise, each core network is able to communicate with each other core network of the group G via a technology of IP type.

The core network CR1, respectively the core network CR2, is here a core network incorporating an IMS architecture and implementing, for the signaling exchanged in the core network, the session initialization protocol SIP. The characteristics of the IMS architecture and the SIP protocol are defined respectively at the level of the 3GPP (3rd Generation Partnership Project) and of the IETF (Internet Engineering Task Force) standards, notably in the documents 3GPP TS 22.228 "Service requirements for the IP Multimedia Core Network Subsystem (Stage 1)" and IETF RFC 3261 "Session Initiation Protocol". They are, therefore, not described in detail here.

This assumption containing the core networks CR1 and CR2 is however not limiting, and the invention also applies to other core network architectures, such as for example to an H323 architecture as well as to signaling protocols other than the SIP protocol.

Each core network CR1, CR2 comprises several functional entities. Thus, in the embodiment described here, each core network CR1, CR2 comprises notably:
- a CSCF (Call Session Control Function) entity, itself composed of several logical items of equipment or servers such as for example:
  - one or more S-CSCF (Serving Call Session Control Function) servers in charge of registering the terminals on the core network considered CR1 or CR2,
  - an I-CSCF (Interrogating Call Session Control Function) server in charge of routing for initializing the connections to the core network, and
  - one or more P-CSCF (Proxy Call Session Control Function) servers, points of contact of the terminals with the core network;
- an HSS (Home Subscriber Server) server in charge of saving the information regarding profiles of the connected users, notably of a pointer to the application server AS and authentication of the users; —an interface entity COM, itself composed of several logical items of equipment or servers such as for example:
- an MGCF (Media Gateway Control Function) server serving as gateway to non-IP networks external to the core network considered, for example an STN network,
- an IBCF (Interconnect Border Control Function) server serving as gateway to networks of IP type external to the core networks of the group G, and
- an entity INT allowing communication with the other core networks of the group G.

The application server AS hosts and provides services. The architecture of the server AS is described in greater detail in the documents 3GPP TS 23.292 entitled "Technical Specification Group Services and System Aspects; IP Multimedia Core Subsystem Centralized Services; Stage 2", release 11, v10.0.0, June 2011 and 3GPP TS 24.292 entitled "Technical Specification Group Core Network and terminals; IP Multimedia Core Network Subsystem Centralized Services; Stage 3", release 10, v10.5.0, September 2001.

The system SYS also comprises one or more terminals F1, F2 etc. able to be connected to the first core network CR1 and to register with the first core network CR1.

The terminals F1, F2 etc. are for example fixed terminals, such as wired telephone terminals, or wireless terminals. They are able to communicate according to the SIP protocol.

The system SYS also comprises one or more terminals M1, M2 etc. able to be connected to the second core network CR2 and to register with the second core network CR2.

The terminals M1, M2 etc. are for example mobile telephone terminals able to communicate according to the SIP protocol.

The system SYS also comprises a database BDD accessible by the application server AS.

The main steps of a processing method and of a management method implemented in the system SYS will now be described with reference to FIGS. 3 and 4.

Figure 3:
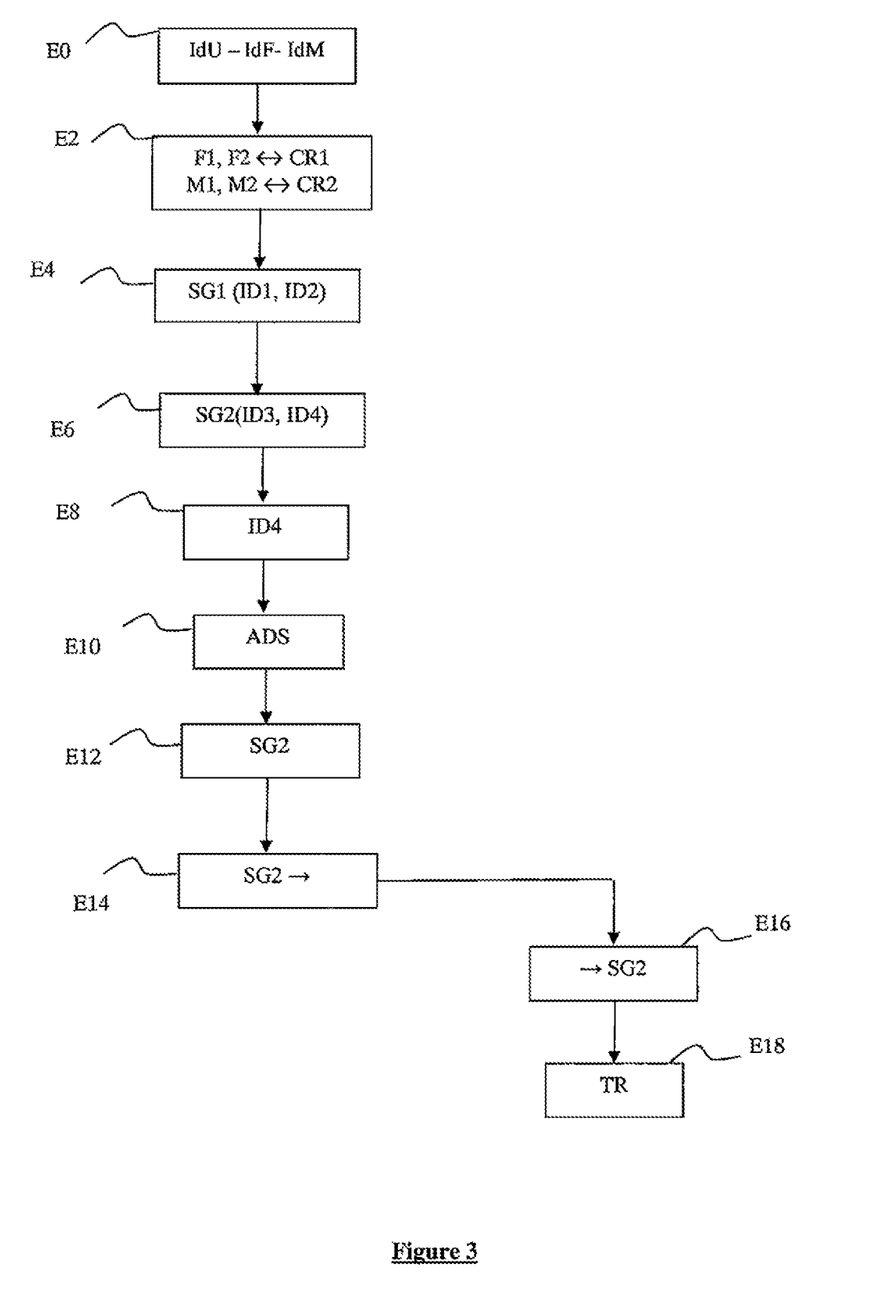
FIG. 3 is a flowchart illustrating the various steps of a processing method and of a management method according to a first embodiment of the invention.

With reference to FIG. 3, during a prior registration step E0, information relating to users is stored in the database BDD.

The information relating to a user is recorded, that is to say registered, during a phase of registration of this user.

This registration is for example carried out subsequent to the connection of the user U, by means of a Web browser, to a registration server (not represented) via an interface of Web type.

The registration server is either the application server AS or some other server, for example a server dedicated to this task able to access the database BDD.

The registration phase comprises notably for each user U, the recording in the database BDD, in association with an identifier IdU of the user U, of an identifier IdF of a first terminal TU able to connect to the first core network CR1 and/or an identifier IdM of a second terminal MU able to connect to the second core network CR2.

In the embodiment described here, an identifier IdT of a terminal T takes the form NT@IdCR in which NT represents a telephone number associated with the user, a telephone number associated with the terminal or else a user name and IdCR represents an identifier of a core network, for example a domain name associated with the core network.

Thus, the identifier IdF takes the form NT@IdCR1 with IdCR1 being a domain name associated with the first core network CR1 and the identifier IdM takes the form NT@IdCR2 with IdCR2 being a domain name associated with the second core network CR2.

By way of alternative the identifier IdT is a telephone number associated with the terminal and it is stored in the database BDD in association with an identifier of one of the core networks.

The registration phase can also comprise the recording, in association with the user identifier IdU of the user U, of service data DS.

The service data DS are data relating to communication services to which the user U has subscribed.

Examples of such services are for example a request for simultaneous ringing on the set of the terminals of the user U during a call destined for a terminal of the user U or a service of diverting the called terminal to another terminal in case of non-response.

Figure 4A:
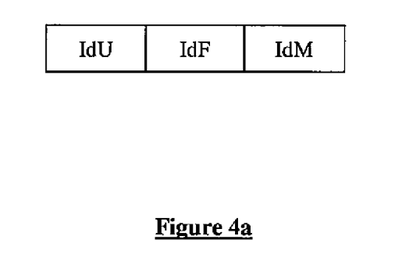
FIG. 4a is an array illustrating a content of a database after a phase of registration of a user.

FIG. 4a illustrates an example of the content of the database BDD for the user U after the registration of this user.

During a step E2, several terminals connect to one or to the other core network of the group G of core networks.

For example, the terminals F1 and F2 connect to the first core network CR1 and the terminals M1 and M2 connect to the second core network CR2.

In a conventional manner, the connection of a terminal to a core network is carried out for example when physically hooking up the terminal to a P-CSCF server of the core network, for example via a wired connection, or when booting the software of the terminal. This hooking up or this booting causes the dispatching by the terminal of a registration message MR1.

Also, in a conventional manner, the connection phase can comprise a step of prior authentication of the terminal.

The message MR1 contains an identifier IdT of the terminal, for example the identifier NT@IdCR, NT being a telephone number associated with the terminal and IdCR being a domain name associated with the core network.

The message MR1 is for example an SIP signaling message REGISTER containing a "TO" field containing the identifier IdT and a "FROM" field also containing the identifier IdT.

The registration message MR1 is transmitted to an S-SCCF server of the core network via the P-CSCF server. Next, the S-SCCF server having received the registration message MR1, transmits a message MR2 containing the identifier IdT to the application server AS via the communication link linking the core network to the application server AS.

The message MR2 is for example an SIP signaling message REGISTER containing an "R-URI" field containing an identifier of the application server AS, for example an address of the application server AS, a "FROM" field containing an address ADS of the 5-CSCF server transmitting the message MR2 and a "TO" field containing the identifier IdT of the terminal.

Following the receipt of the registration message MR2, the application server AS obtains the address ADS of the S-CSCF server having transmitted the registration message MR2 and records it in the database BDD in association with the identifier of the terminal IdT.

In the embodiment described here, the address ADS is extracted from the signaling message MR2 received.

The application server AS thereafter sets a status indicator VS of the terminal to the value "connected".

The status indicator VS allows the application server AS to know whether or not a terminal is connected to the core network. The value of the status indicator VS is for example recorded in the database BDD in association with the terminal identifier IdT. Before the first connection of the terminal, that is to say during the registration phase, the status indicator VS is for example set to the value "disconnected".

Next, the application server AS dispatches in return to the S-CSCF server of the core network, via the communication link linking the core network to the application server AS, a signaling message MR3 indicating that the connection of the terminal is effective. The signaling message MR3 is for example an SIP signaling message "200 ok".

In the case where the connection is not effective, for example if the terminal is not previously registered in the database BDD, the message MR3 signals an error in the execution of the connection.

Figure 4B:
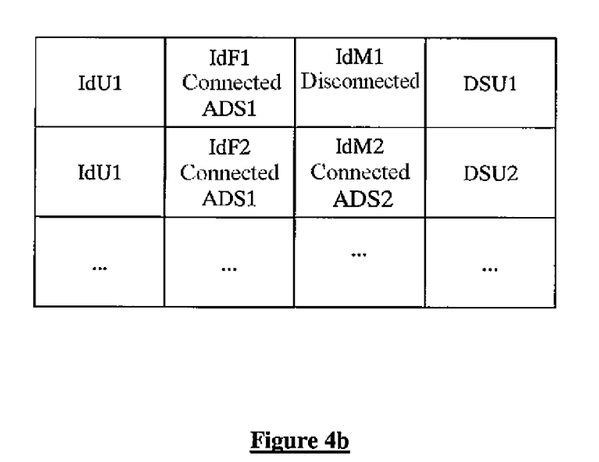
FIG. 4b is an array illustrating a content of a database after a phase of connecting a terminal.

FIG. 4b illustrates an example of the content of the database BDD after the registration of the terminals F1 and M1 by a user U1 of identifier IdU1, after the registration of the terminals F2 and M2 of a user U2 of identifier IdU2 and after the connection of the terminals F1, F2 and M2.

The terminal F1 comprises an identifier IdF1. The identifier IdF1 is an identifier of the first core network CR1. The status indicator associated with the terminal F1 is in the "connected" state and the address of the S-SCCF server to which the terminal F1 is connected is ADS1.

The terminal M1 comprises an identifier IdM1. The identifier IdM1 is an identifier of the second core network CR2. The status indicator associated with the terminal M1 is in the "disconnected" state.

The terminal F2 comprises an identifier IdF2. The identifier IdF2 is an identifier of the second core network CR2.

The status indicator associated with the terminal F2 is in the "connected" state and the address of the S-SCCF server to which the terminal F2 is connected is ADS1.

The terminal M2 comprises an identifier IdM2. The identifier IdM2 is an identifier of the second core network CR2. The status indicator associated with the terminal M2 is in the "connected" state and the address of the S-SCCF server to which the terminal M2 is connected is ADS2.

Service data DSU1, respectively DSU2 are recorded in association with the user identifier IdU1, respectively IdU2.

In the example illustrated here, the terminals F1 and F2 are connected to the same S-CSCF server.

By way of alternative, the terminals F1 and F2 are connected respectively to different S-CSCF servers of the first core network CR1.

Likewise, the terminals M1 and M2 can be connected respectively to different C-CSCF servers of the second core network CR2.

During a step E4, an S-CSCF server of the first core network CR1 transmits a signaling message SG1 to the application server AS and the application server AS receives the signaling message SG1 via a first communication link L1 established between the application server AS and the first core network CR1.

The signaling message SG1 represents a first signaling message SG1 within the meaning of the invention.

As described subsequently, in conjunction with various particular embodiments, the signaling message SG1 is for example a call establishment request message sent by a terminal connected to the first core network CR1 or by a terminal not connected to one of the core networks of the group G of core networks.

The signaling message SG1 contains an identifier ID1 of the terminal sending the message and a recipient terminal identifier ID2.

The terminal identifier ID1 is here an identifier of a terminal connected to the first core network CR1 or an identifier of a terminal of an exterior network.

By terminal of an exterior network is meant a terminal not connected to a core network of the group G of core networks.

The terminal identifier ID2 is an identifier of a recipient terminal receiving the signaling message SG1.

The message SG1 is for example a signaling message of SIP INVITE type containing a "FROM" field containing the identifier ID1 and a "TO" field containing the identifier ID2.

By way of alternative, the signaling message SG1 received by the application server AS originates from an S-CSCF server of the second core network CR2, via the second communication link L2.

During a step E6, the application server AS obtains a second signaling message SG2.

The second signaling message SG2 is either the first signaling message SG1, or a signaling message generated by the application server AS on the basis of the first signaling message SG1, following the receipt of this message.

The second signaling message SG2 contains a first identifier ID3 and an identifier ID4 of the terminal receiving the second signaling message SG2.

The first identifier ID3 is for example an identifier of the first terminal connected to the first core network CR1 or an identifier of a terminal of an exterior network.

The message SG1 is for example a signaling message of SIP INVITE type.

During a step E8, the application server AS analyses the second signaling message SG2 to determine, as a function of the recipient terminal identifier contained in the second signaling message SG2, whether this terminal is connected to a core network of the group G of core networks other than the core network that transmitted the first signaling message SG1.

The analysis step E8 makes it possible to determine whether the recipient terminal identifier ID4 is an identifier of a terminal connected to a core network of the group G of core networks other than the core network that transmitted the first signaling message SG1.

In the embodiment described, the analysis step E8 makes it possible to determine whether or not the recipient terminal identifier ID4 is an identifier of second core network CR2.

More precisely, the application server AS extracts the recipient terminal identifier ID4 from the second signaling message SG2.

In the embodiment described here where the identifier ID4 is of the form NT@IdCR, the value IdCR makes it possible to determine the core network to which the terminal with identifier ID4 is connected.

By way of alternative, the database BDD contains a list of terminal identifiers for each core network and the recipient terminal identifier ID4 is searched for in the lists.

In the case where the recipient terminal identifier ID4 is an identifier of a terminal connected to the same core network as the first terminal, that is to say in the embodiment described here, an identifier of a terminal connected to the first core network CR1 or if the recipient terminal identifier ID4 is not an identifier of a core network of the group G, the signaling message SG2 is processed in a conventional manner by the application server AS and a signaling message is transmitted to the S-CSCF server of the first core network CR1 in response to the first signaling message SG1 sent by the latter.

In the case where the determination is positive, that is to say in the case where the recipient terminal identifier ID4 is an identifier of the second core network CR2, the application server AS searches for the recipient terminal identifier ID4 in the database BDD and extracts the status indicator VS associated with this identifier ID4.

In the case where the identifier ID4 is not in the database BDD, the application server AS returns a response message, via the first communication link L1, to the S-CSCF server that sent the first signaling message SG1 during step E4 and this S-CSCF server processes the response message.

In the case where the recipient terminal identifier ID4 is in the database BDD but the recipient terminal is not connected, that is to say that the status indicator VS is at the value "disconnected", a signaling message is also returned by the application server AS to the S-CSCF server of the first core network CR1, via the first communication link L1.

By way of alternative, the status indicator VS is not analyzed.

In the case where the identifier ID4 is recorded in the database BDD and the status indicator VS is at the value "connected", the application server AS extracts from the database BDD, during a step E10, the S-CSCF server's address ADS recorded in association with the identifier ID4 of the recipient terminal.

In the embodiment described where the recipient identifier ID4 takes the form of an NT@IdCR, the identifier IdCR makes it possible to identify the associated core network.

By way of alternative, the identifier of the recipient terminal is a telephone number and an associated core network identifier is obtained by the application server AS by consulting a correspondence table containing telephone numbers associated respectively with an identifier of a core network of the group G.

The correspondence table is for example recorded in the database BDD.

During a step E12, the application server AS inserts a processing indicator TR into the signaling message SG2.

The signaling message SG2 contains the recipient terminal identifier ID4.

The processing indicator TR signals that the message SG2 has been processed by the application server AS, that is to say that the services recorded in the service data for the user of the recipient terminal have been taken into account by the application server AS.

The processing indicator TR is for example a parameter described in the SIP protocol, for example a "no services" parameter of the "route" SIP field.

The signaling message SG2 is for example a signaling message of SIP INVITE type.

Step E12 is followed by a step E14 during which the application server AS transmits the signaling message SG2 destined for the recipient terminal with identifier ID4.

The signaling message SG2 is transmitted by the application server AS to the S-CSCF server having as address the address ADS extracted from the database during step E8.

The signaling message SG2 is transmitted to the S-CSCF server of address ADS via a second communication link L2 established between the application server AS and the second core network CR2.

The signaling message SG2 is for example transmitted in the form of a message of OOTB (for 'Out Of The Blue') type. A message of OOTB type is a signaling message dispatched on the initiative of the application server AS. The messages of OOTB type are for example described in document 3GPP TS 24.229.

Step E14 is followed by a step E16 during which the signaling message SG2 is received by the S-CSCF server of the second core network CR2.

During a step E18, this S-CSCF server determines by virtue of the processing indicator TR contained in the message SG2 that the message SG2 received has already been processed by the application server AS and retransmits the message SG2 to the recipient terminal directly.

As a variant, following the receipt of the signaling message SG2 by the S-CSCF server of the second core network CR2, the signaling message SG2 is processed in a conventional manner by the S-CSCF server of the second core network CR2, that is to say it is transmitted to the application server AS like any signaling message arriving at the level of an S-CSCF server. In this case, the application server AS determining that the message contains a processing indicator returns this message to the S-CSCF server that originated the dispatching of this message without processing it.

Also, as a variant, the signaling message SG2 does not contain any processing indicator TR. In this case, the S-CSCF server determines that the message originates from the second communication link L2 and transmits it to the recipient terminal without returning it to the application server AS.

In the embodiment described here, the S-CSCF server's address ADS recorded in the database BDD in association with a terminal identifier is extracted from the signaling message MR2 received during a connection step E2.

In a first variant of the embodiment, the address ADS is obtained by the application server AS after the phase of connection of the terminal with a core network.

In a known manner, the address ADS is recorded in the HSS server by the S-CSCF server during the connection phase.

In this variant of the embodiment, the application server AS obtains this address ADS recorded in the HSS server, in response to a prompt that it transmits to the HSS server. The communication interface used to exchange the prompt and the response between the application server AS and the HSS server is an Sh interface described in the standards 3GPP TS 29.328 and 3GPP TS 29.329. The Sh interface allows information exchange between the application server AS and the HSS server through a dedicated communication channel. It uses for example the Diameter authentication protocol described in the standard IETF RFC 3588 "Diameter Base Protocol".

In another variant of the embodiment, during step E14, the signaling message SG2 is transmitted by the application server AS to the I-CSCF server which retransmits the message SG2 to the S-CSCF server to which the terminal is connected, based on the information recorded in the HSS server. In this case, the address of the I-SCCF server of the first core network CR1 has been previously stored, in a static manner in a memory accessible by the application server AS. In this variant embodiment, it is not necessary for the application server AS, during the connection step E2, to record the address ADS of the S-CSCF server that transmitted the registration message MR2.

Steps E0 to E14 represent the processing method steps implemented for example by the application server AS.

Steps E16 and E18 represent the management method steps implemented for example by an S-CSCF server of the second core network CR2.

In the embodiment described, the signaling messages SG1 and SG2 are signaling messages of SIP INVITE type.

The invention also applies to other SIP signaling messages such as for example REGISTER, SUBSCRIBE, NOTIFY, REFER etc.

A first exemplary particular implementation will now be described with reference to FIG. 5.

Figure 5:
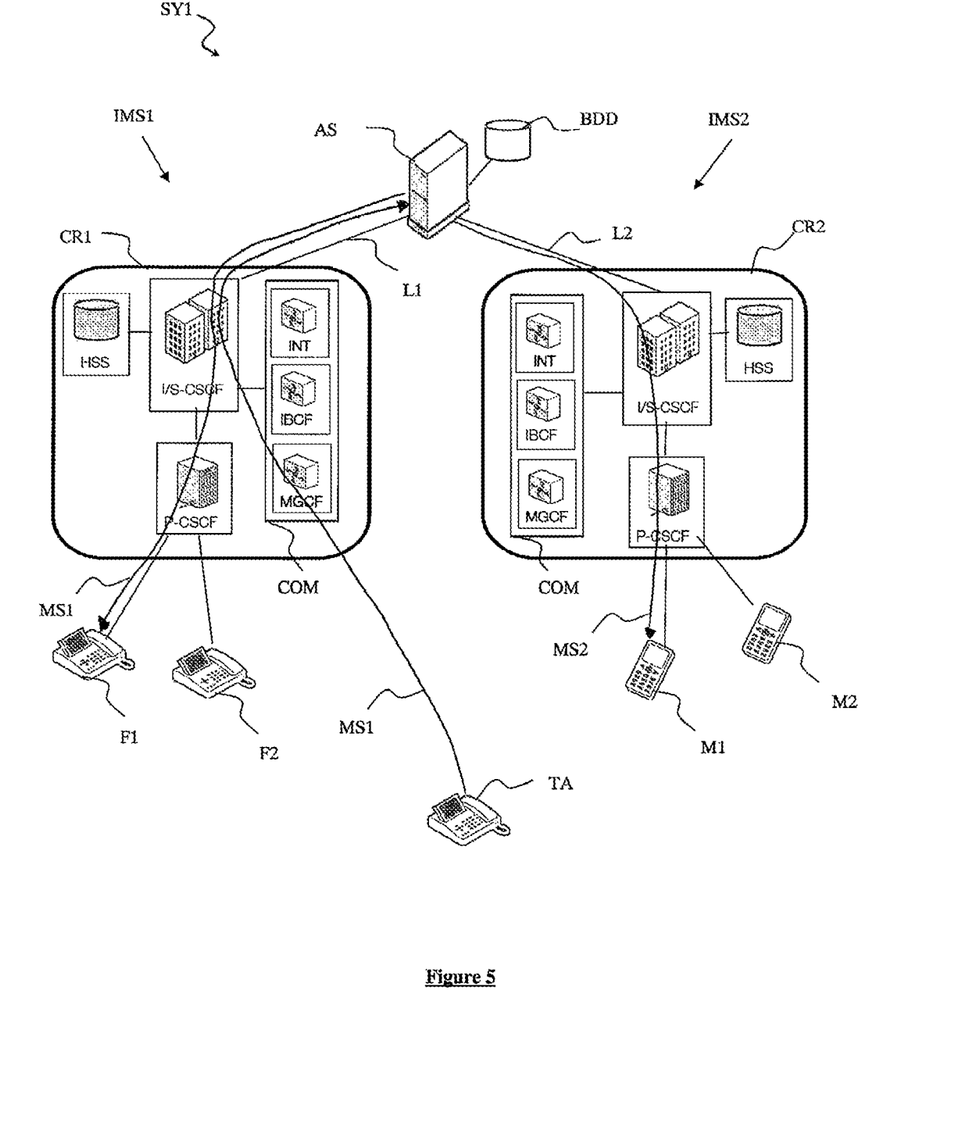
FIG. 5 is a diagram illustrating the path of signaling messages according to a first exemplary implementation of the invention.

FIG. 5 illustrates a system SY1 comprising a first core network CR1, a second core network CR2, an application server AS and a database BDD.

The first core network CR1, the second core network CR2 and the application server AS are similar to those described previously in conjunction with FIG. 2.

During a registration phase, an identifier IDF1 of a first terminal F1, an identifier IDM1 of a second terminal M1 and service data DS have been recorded in the database BDD in association with an identifier IdU1 of a user U1.

The service data DS comprise notably data indicating that the user U1 has subscribed to a service of simultaneous ringing on both the terminals F1 and M1.

The first terminal F1 of the user U1 is connected and registered with the first core network CR1. During the phase of registering of the terminal F1 with the core network CR1, a status indicator VS1, set to the value "connected" and an address ADF of the S-CSCF server to which the first terminal F1 is connected have been recorded in the database BDD in association with the identifier IDF1 of the terminal F1.

The second terminal M1 of the user U1 is connected and registered with the second core network CR2.

During the phase of registering of the terminal M1 with the core network CR2, a status indicator VS2, set to the value "connected" and an address ADM of the S-CSCF server to which the second terminal M1 is connected have been recorded in the database BDD in association with the identifier IDM1 of the terminal M1.

The system SY1 also comprises a terminal TA of a user U2. The user U2 is registered neither with the first core network CR1, nor with the second core network CR2.

The terminal TA is for example a terminal connected to the STN (for "Switched Telephone Network") network.

By way of alternative, the terminal TA is connected to a core network other than the first core network and other than the second core network CR2.

The user U2 wishing to establish a telephone call with the user U1, from their terminal TA, inputs the identifier IDF1 of the first terminal F1 by means of a user interface, for example a numerical keypad, or selects this identifier from a directory. A signaling message MS1 is then dispatched by the terminal TA and transmitted, via the MGCF and I-CSCF servers of the first core network CR1, to the S-CSCF server to which the terminal F1 is connected and then retransmitted by this S-CSCF server to the application server AS via the communication link L1.

The message MS1 contains a first terminal identifier ID1 and a second terminal identifier ID2.

The first terminal identifier ID1 is an identifier of the terminal TA that originated the call and the second terminal identifier ID2 is the identifier IDF1 of the terminal F1.

Following the receipt of the message MS1, the application server AS determines by virtue of the service data DS that the user U1 has subscribed to a simultaneous ringing service and constructs a message MS2 containing a first identifier ID3 and a second identifier ID4. The first identifier ID3 is the identifier ID1 of the calling terminal TA and the second identifier ID4 is the identifier IDM1 of the terminal M1. The identifier ID4 is the identifier of the recipient terminal receiving the message MS2.

The application server AS determines that the identifier IDM1 of the terminal M1 is a second core network CR2 identifier whilst the message MS1 has been received by the application server AS from the first core network CR1.

The application server AS inserts a processing indicator TR into the message MS2.

Next, it transmits the message MS2 to the second core network CR2 via a second communication link L2 established with the second core network CR2. More precisely, the message MS2 is transmitted to the S-CSCF server whose address ADM has been stored previously in the database BDD in association with the identifier IDM1 of the terminal M1.

The message MS2 is received by the S-CSCF server of the second core network CR2 with address ADM and transmitted directly to the terminal M1 thus causing the activation of the ringing of this terminal.

The processing indicator TR allows the S-CSCF server to know that it is not necessary to converse with the application server AS before transmitting the signaling message MS2 to the terminal M1.

Moreover, the message MS1 is returned to the S-CSCF server of the first core network CR1 via the first established communication link L1. The message MS1 is thereafter transmitted to the terminal F1, thus causing the activation of the ringing of the terminal F1.

A second particular example of implementation will now be described with reference to FIG. 6.

Figure 6:
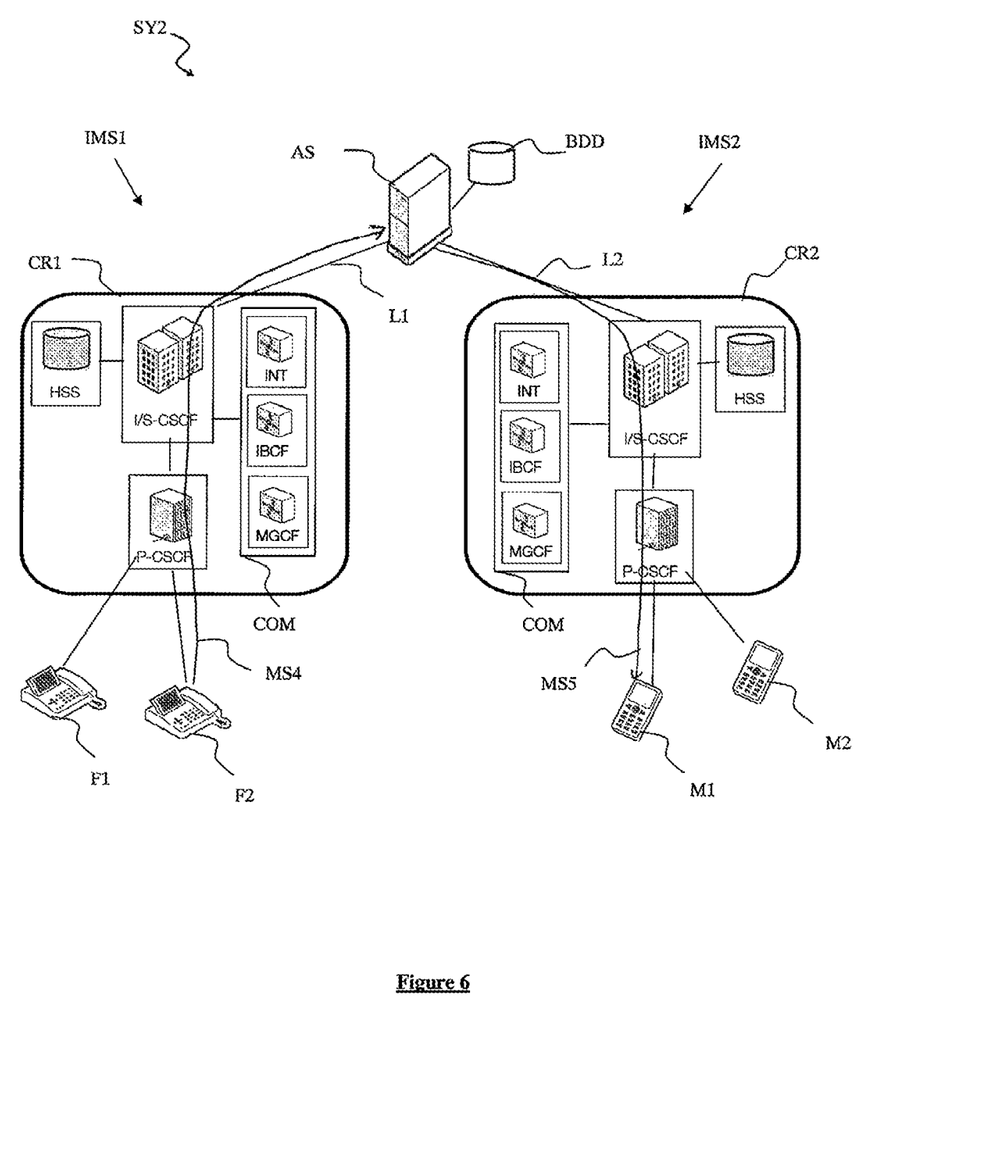
FIG. 6 is a diagram illustrating the path of signaling messages according to a second exemplary implementation of the invention.

FIG. 6 illustrates a system SY2 comprising a first core network CR1, a second core network CR2, an application server AS and a database BDD.

The first core network CR1, the second core network CR2, the application server AS and the database BDD are similar to those described previously in conjunction with FIG. 2.

During a phase of registration of a user U1, an identifier IDF1 of a first terminal F1, an identifier IDM1 of a second terminal M1 and service data DS have been recorded in the database BDD in association with an identifier IdU1 of the user U1.

The service data DS comprise notably data indicating that the user U1 has subscribed to a service of call diversion from the terminal F1 to the terminal M1.

During a phase of registration of a user U2, an identifier IDF2 of a fixed terminal F2 has been recorded in the database BDD in association with an identifier Id2 of the user U2.

The first terminal F1 of the user U1 is connected and registered with the first core network CR1. During the phase of connection of the terminal F1 with the core network CR1, a status indicator VS1, set to the value "connected" and an address ADF of the S-CSCF server to which the first terminal F1 is connected have been recorded in the database BDD in association with the identifier IDF1 of the terminal F1.

The second terminal M1 of the user U1 is connected and registered with the second core network CR2.

The terminal F2 of the user U2 is connected and registered with the first core network CR1.

During the phase of registering of the terminal M1 with the second core network CR2, a status indicator VS2, set to the value "connected" and an address ADM of the S-CSCF server to which the terminal M1 is connected have been recorded in the database BDD in association with the identifier IDM1 of the terminal M1.

The user U2 wishing to establish a telephone call with the user U1, from their terminal F2, inputs the identifier IDF1 of the terminal F1 by means of a user interface, for example a numerical keypad, or selects this identifier from a directory. A signaling message MS4 is dispatched by the terminal F2 and transmitted to the S-CSCF server to which the terminal F2 is connected and then retransmitted by this S-CSCF server to the application server AS.

The message MS4 contains a first terminal identifier ID1 and a second terminal identifier ID2.

The first terminal identifier ID1 is the identifier IDF2 of the terminal F2 that originated the call and the second terminal identifier ID2 is an identifier IDF1 of the recipient terminal F1 receiving the call.

Following the receipt of the message MS4, the application server AS determines by virtue of the service data DS that the user U1 has subscribed to a call diversion service and constructs a message MS5 containing a first identifier ID3 and a second identifier ID4. The first identifier ID3 is the identifier of the calling terminal F2 and the second identifier ID4 is the identifier IDM1 of the terminal M1.

The application server AS determines that the identifier IDM1 of the terminal M1 is a second core network CR2 identifier whilst the message MS4 has been received by the first core network CR1.

It inserts a processing indicator TR into the message MS5.

Next, it transmits the message MS5 to the second core network CR2 via a second communication link L2 established with the second core network CR2. More precisely, the message MS5 is transmitted to the S-CSCF server whose address ADM has been stored previously in the database BDD in association with the identifier IDM1 of the terminal M1.

The message MS5 is received by the S-CSCF server of the second core network CR2 and transmitted directly to the terminal M1 thus causing the activation of the ringing of this terminal.

A third exemplary particular implementation will now be described with reference to FIG. 7.

Figure 7:
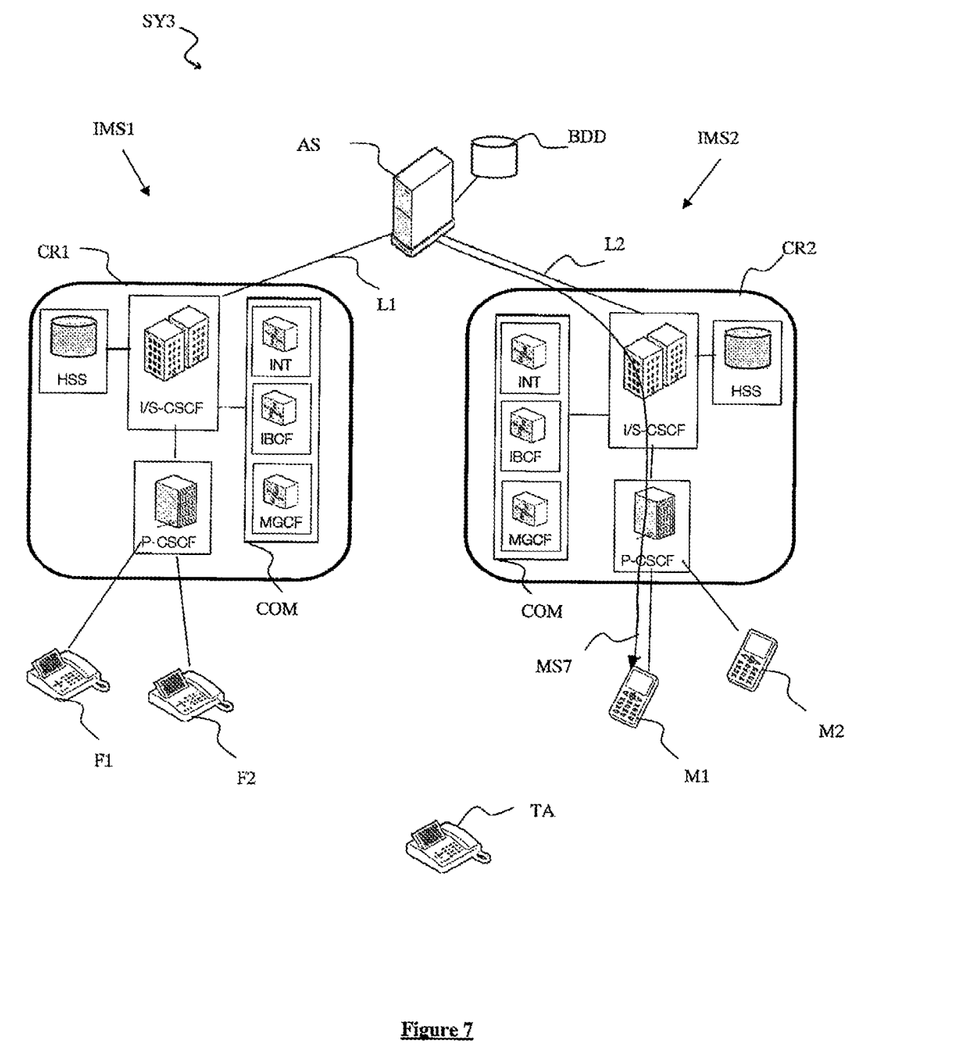
FIG. 7 is a diagram illustrating the path of signaling messages according to a third exemplary implementation of the invention.

FIG. 7 illustrates a system SY3 comprising a first core network CR1, a second core network CR2, an application server AS and a database BDD.

The first core network CR1, the second core network CR2, the application server AS and the database BDD are similar to those described previously in conjunction with FIG. 2.

During a registration phase, an identifier IDF1 of a first terminal F1, an identifier IDM1 of a second terminal M1 and service data DS have been recorded in the database BDD in association with an identifier IdU1 of a user U1.

The service data DS comprise notably data indicating that the user U1 has subscribed to a call transfer service on both the terminals F1 and M1.

The first terminal F1 of the user U1 is connected and registered with the first core network CR1. During the phase of registering of the terminal F1 with the core network CR1, a status indicator VS1, set to the value "connected", and an address ADF of the S-CSCF server to which the first terminal F1 is connected have been recorded in the database BDD in association with the identifier IDF1 of the terminal F1.

The second terminal M1 of the user U1 is connected and registered with the second core network CR2.

During the phase of registering of the terminal M1 with the core network CR2, a status indicator VS2, set to the value "connected" and an address ADM of the S-CSCF server to which the second terminal M1 is connected have been recorded in the database BDD in association with the identifier IDM1 of the terminal M1.

The system SY3 also comprises a terminal TA of a user U2. The terminal TA of the user U2 is for example a terminal which is registered neither with the first core network CR1, nor with the second core network CR2.

By way of alternative, the terminal TA is a terminal connected to the first core network CR1 or to the second core network CR2.

It is assumed that a telephone call is established between the terminal TA and the terminal F1.

This call is for example established at the request of the terminal TA.

By way of alternative, the call is established at the request of the terminal F1.

In the course of conversation, the user U1 of the terminal F1 wishes to continue the conversation with their mobile terminal M1 and then requests the transfer of the established communication from their terminal F1 to the terminal M1.

This transfer is for example requested with the aid of a software application installed on the terminal F1 and able to transmit a prompt of HTTP (for "HyperText Transfer Protocol") type to the application server AS.

By way of alternative, the user U1 activates a "predetermined" key of the terminal F1 and the activation of this key causes the dispatching by the terminal F1 of a signaling message of REFER type defined in the SIP protocol to the application server AS.

Following the receipt of this transfer request, the application server AS determines that a transfer to the terminal M1 of the established communication has been requested by the user U1 and constructs a message MS7 containing a first identifier ID3 and a second identifier ID4. The first identifier ID3 is an identifier ID1 of the calling terminal TA and the second identifier ID4 is the identifier IDM1 of the terminal M1. The identifier ID4 is the identifier of the recipient terminal receiving the message MS7.

The message MS7 is obtained here as a function of a first signaling message received by the application server during the establishment of the communication in progress or as a function of a signaling message REFER received via the first communication link L1.

The application server AS determines that the identifier IDM1 of the terminal M1 is a second core network CR2 identifier whilst the first signaling message has been received by the application server AS from the first core network CR1.

The application server AS inserts a processing indicator TR into the message MS7.

Next, it transmits the message MS7 to the second core network CR2 via a second communication link L2 established with the second core network CR1. More precisely, the message MS7 is transmitted to the S-CSCF server whose address ADM has been stored previously in the database BDD in association with the identifier IDM1 of the terminal M1.

The message MS7 is received by the S-CSCF server of the second core network CR2 with address ADM and transmitted to the terminal M1 thus causing the activation of the ringing of this terminal.

It is specified that the message MS7 is transmitted directly to the terminal M1 without re-invoking the application server AS for the terminal M1 by virtue of the processing indicator TR.

In a conventional manner, by taking the terminal M1 "off-hook", the user U1 causes the transfer of the communication established between the terminal TA and the terminal F1 to a communication established between the terminal TA and the terminal M1: This consequently causes the breakage of the communication established between the terminal TA and the terminal F1.

Figure 8:
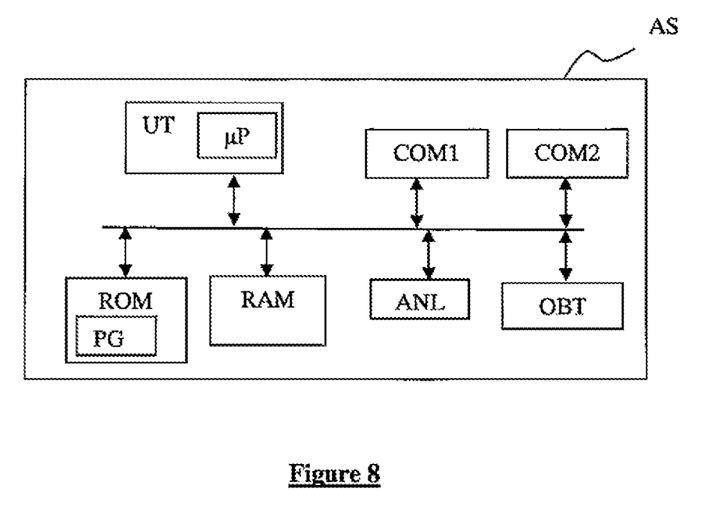
FIG. 8 is a diagram illustrating a device able to carry out the steps of a processing method according to an embodiment of the invention.

According to a chosen embodiment, represented in FIG. 8, a device implementing a processing method according to the invention is for example an application server AS which comprises, in a known manner, notably a processing unit UT equipped with a microprocessor, a read-only memory of ROM or EEPROM type, a random-access memory of RAM type.

This device AS comprises a first communication module COM1, an obtaining module OBT, an analysis module ANL and a second communication module COM2.

The first communication module COM1 is able to send and receive signaling messages relating to a communication between two users, via a first communication link established between said application server and a first set of devices forming a first core network.

The obtaining module OBT is able to obtain, as a function of a first signaling message received via the first communication link, a second signaling message comprising an identifier of a recipient terminal of said second message.

The analysis module ANL is able to determine, as a function of said recipient terminal identifier, whether said recipient terminal is connected to a second core network of a predefined group of core networks, said second core network being different from said first core network.

The second communication module COM2 is able to transmit, in case of positive determination, the second signaling message via a second communication link established between said application server and a second set of devices forming said second core network.

Figure 9:
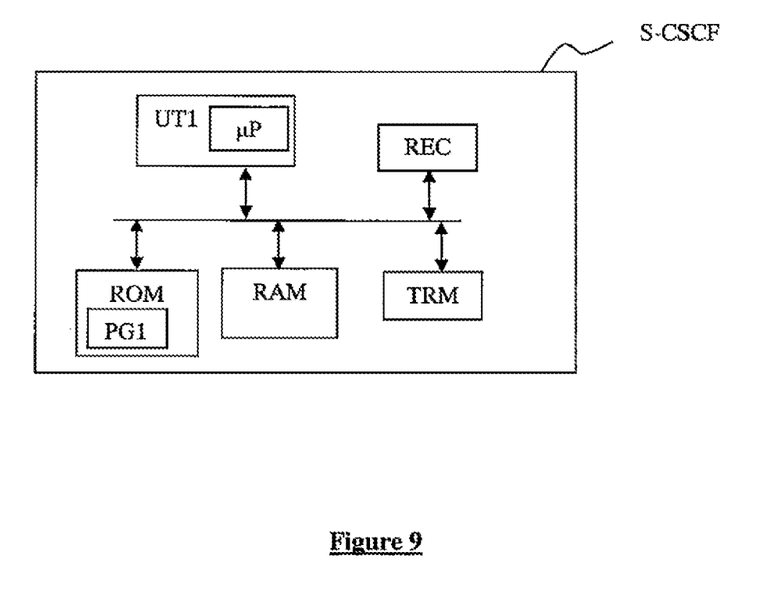
FIG. 9 is a diagram illustrating a device able to carry out the steps of a management method according to an embodiment of the invention.

According to a chosen embodiment, represented in FIG. 9, a device implementing a management method according to the invention is for example an S-CSCF server of a set of devices forming a core network which comprises, in a known manner, notably a processing unit UT1 equipped with a microprocessor, a read-only memory of ROM or EEPROM type, a random-access memory of RAM type.

This S-CSCF device comprises a reception module REC and a transmission module TRM.

The reception module REC is able to receive, via a second communication link established between an application server and said server, a second signaling message relating to a communication between two terminals and comprising a terminal identifier for the recipient of said message, said second message having been obtained by said application server as a function of a first signaling message received by said application server via a first communication link established between said application server and a first set of devices forming a first core network.

Said second message can also comprise a processing indicator indicating to said control server that said second message has been processed by said application server.

The transmission module TRM is able to transmit said second message destined for said recipient terminal.

The EEPROM read-only memory contains a computer program PG1 comprising program instructions adapted to carry out the steps of a management method according to the invention.

During power-up, the program PG1 stored in the memory of EEPROM type is transferred into the random-access memory which will then contain an executable code as well as registers for storing the variables necessary for the implementation of a step of receiving, via a second communication link established between an application server and said server, a second signaling message comprising a terminal identifier for the recipient of said second message, said second message having been obtained by said application server as a function of a first signaling message received by said application server via a first communication link established between said application server and a first set of devices forming a first core network; and of a step of transmitting said second message destined for said second terminal.

The invention claimed is:

1. A communication-related processing method, implemented by an application server able to send and to receive signaling messages via a first communication link established between said application server and a first set of devices forming a first IMS (IP Multimedia System) core network, wherein the method comprises the following steps:
   receiving from a sending user terminal, via the first communication link, a first signaling message;
   obtaining, as a function of said first signaling message received, a second signaling message comprising an identifier of a recipient terminal;
   analyzing to determine, as a function of said recipient terminal identifier, whether said recipient terminal is connected to a second IMS core network, said second core network being different from said first core network;
   in case of positive determination:
      inserting a processing indicator in said second signaling message, said processing indicator including information that at least one service recorded in services data for a user of the recipient terminal has been taken into account by the application server; and
      transmitting said second signaling message to the recipient terminal.

2. The processing method as claimed in claim 1, in which said recipient terminal identifier comprises an identifier of the second core network.

3. The processing method as claimed in claim 1, in which during the transmission step, said second signaling message is transmitted to a device of a second set of devices forming the second core network, an address of said device of said second set of devices being previously recorded in association with said recipient terminal identifier.

4. The processing method as claimed in claim 3, in which said address is recorded by said application server following the receipt of a registration message transmitted previously by said recipient terminal.

5. The processing method as claimed in claim 1, in which said second signaling message is said first signaling message.

6. The processing method as claimed in claim 1, in which said second signaling message is determined as a function of a terminal identifier contained in said first signaling message and as a function of service data previously recorded in association with a user identifier of said terminal.

7. An application server comprising a first communication module for sending and receiving signaling messages relating to a communication between two users, via a first communication link established between said application server and a first set of devices forming a first IMS core network, wherein the application server comprises:
  a module for obtaining, as a function of a first signaling message received from a sending user terminal via the first communication link, a second signaling message comprising an identifier of a recipient terminal;
  an analysis module for determining, as a function of said recipient terminal identifier, whether said recipient terminal is connected to a second IMS core network, said second IMS core network being different from said first IMS core network;
  a second communication module for transmitting, in case of positive determination, said second signaling message to the recipient terminal, said second signaling message including a processing indicator, said processing indicator including information that at least one service recorded in services data for a user of the recipient terminal has been taken into account by the application server.

8. A server of a set of devices forming a second IMS core network, comprising:
  a reception module for receiving, a second signaling message relating to a communication and comprising a terminal identifier for the recipient of said second signaling message and a processing indicator, said processing indicator including information that at least one service recorded in services data for a user of the recipient terminal has been taken into account by an application server,
  a transmission module for transmitting said second signaling message destined for said recipient terminal.

9. The method of claim 1 wherein the second signaling message signals that at least one service stored in data services is stored in association with an identifier of a user of the recipient terminal.

10. The method of claim 1 wherein the second signaling message is transmitted via a second communication link established between the application server and a second set of devices forming the second IMS core network.

11. A non-transitory computer-readable medium storing a computer program able to be implemented by an application server able to send and to receive signaling messages via a first communication link established between said application server and a first set of devices forming a first IMS (IP Multimedia System) core network, the program comprising code instructions which, when executed by a processor, carries out a communication-related processing method comprising:
  receiving, from a sending user terminal, via the first communication link, a first signaling message;
  obtaining, as a function of said first signaling message received, a second signaling message comprising an identifier of a recipient terminal;
  analyzing to determine, as a function of said recipient terminal identifier, whether said recipient terminal is connected to a second IMS core network, said second core network being different from said first core network;
  in case of positive determination, inserting a processing indicator in said second signaling message, said processing indicator including information that at least one service recorded in services data for a user of the recipient terminal has have been taken into account by the application server and transmitting said second signaling message to the recipient terminal.

12. A non-transitory computer-readable information medium on which a computer program is stored, the computer program able to be implemented by an application server able to send and to receive signaling messages via a first communication link established between said application server and a first set of devices forming a first IMS (IP Multimedia System) core network, the program comprising code instructions which, when executed by a processor, carries out a communication-related processing method comprising:
  receiving, from a sending user terminal, via the first communication link, a first signaling message;
  obtaining, as a function of said first signaling message received, a second signaling message comprising an identifier of a recipient terminal;
  analyzing to determine, as a function of said recipient terminal identifier, whether said recipient terminal is connected to a second IMS core network, said second core network being different from said first core network;
  in case of positive determination, inserting a processing indicator in said second signaling message, said processing indicator including information that at least one service recorded in services data for a user of the recipient terminal has been taken into account by the application server and transmitting said second signaling message to the recipient terminal.

* * * * *